Figure 1:
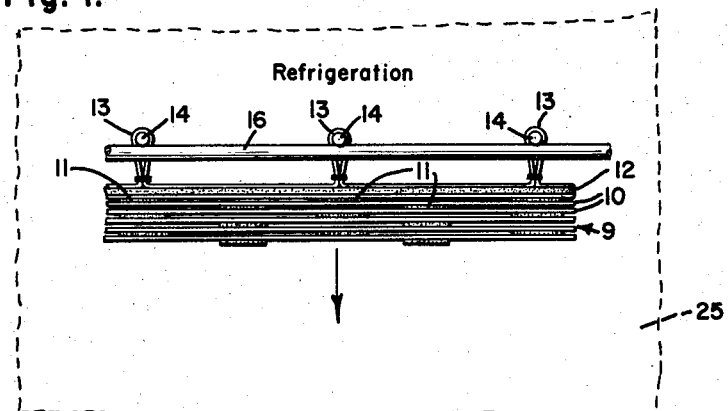

Sept. 15, 1964  R. P. FORSBERG  3,149,008
METHOD OF EXPANDING METAL HONEYCOMB AT SUB-ZERO TEMPERATURES
Filed Nov. 24, 1958

INVENTOR
Richard P. Forsberg
BY 3,149,008
METHOD OF EXPANDING METAL HONEYCOMB AT SUB-ZERO TEMPERATURES
Richard P. Forsberg, Berkeley, Calif., assignor to Hexcel Products Inc., Berkeley, Calif., a corporation of California
Filed Nov. 24, 1958, Ser. No. 775,885
1 Claim. (Cl. 148—125)

This invention relates to a new and improved method of expanding unexpanded aluminum alloy foil honeycomb.

In the art of manufacturing aluminum foil honeycomb frequently the honeycomb is formed of glued or welded flat sheets of material to form what is hereinafter called an unexpanded honeycomb block. There are various mechanical means available for drawing the block out so as to expand the block to form a cellular structure such as for example, shown in United States Patent No. 2,674,295, filed December 13, 1950, and issued April 6, 1954, and United States Patent No. 2,756,496, filed October 21, 1952, and issued July 31, 1956.

The principal object of this invention is to provide an ambient atmosphere of substantially reduced temperature for the unexpanded block during the drawing out or expanding step in the formation of honeycomb.

A feature and advantage of the process of this invention is that honeycomb formed of thinner gauge web is drawn out in more regular and consistent cell configuration.

Another object of this invention is to provide a method of drawing out or expanding an unexpanded block of aluminum foil honeycomb so as to obtain more uniform cell configuration by temporarily increasing the yield and tensile strength of the foil during the expanding or drawing out of the honeycomb block.

Other objects of the present invention will become apparent upon reading the following specification and referring to the accompanying drawings in which similar characters of reference represent corresponding parts in each of the several views.

In the drawings:

FIG. 1 is a fragmentary view disclosing a block of honeycomb in unexpanded condition.

Figure 2:
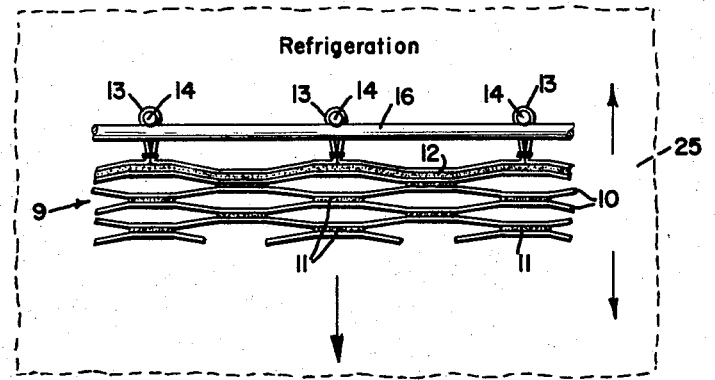

FIG. 2 discloses a similar view of the block of honeycomb shown in the partially expanded condition.

Figure 3:
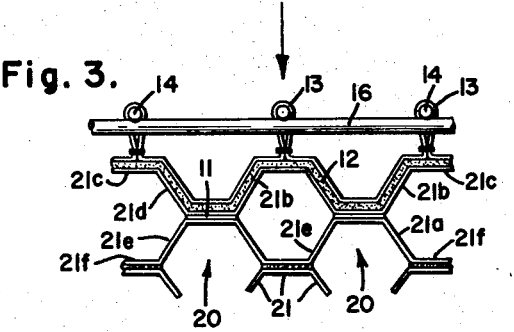

FIG. 3 shows a similar view of the block of honeycomb in the expanded condition.

Referring now particularly to the drawings there is shown in FIG. 1 an unexpanded block of aluminum alloy foil honeycomb jigged within a type of equipment as fully described in United States Patent No. 2,756,496 which may be employed for carrying out the invention. The block of metal foil generally indicated at 9 comprises a plurality of individual strips or webs of metal foil 10 in which adjacent webs or strips are bonded to one another by alternately staggered bonding lines as indicated at 11. It is noted that all the bonding lines extend in a substantially common direction parallel with the transverse axis of the honeycomb block.

Anchor strips 12 are applied to the blocks to supply substantially uniform expansion force. Each anchor strip is formed with a plurality of spaced loops 13 in which tug pins 14 are inserted. The pursable anchor strips may be adhesively secured to opposite ends or end webs of the honeycomb block and attached via tugging pins 14 and loops 13 to a pull bar 16. The pull bar may be pulled apart by any suitable mechanism, to expand the block to a honeycomb cell structure. The expansion steps are progressively indicated in FIGS. 1 through 3 wherein FIG. 1 is illustrative of the cell of the block in the unexpanded condition, FIG. 2 in the intermediate condition and FIG. 3 in the expanded condition.

It is highly desirable in the art that each of the cells be of regular uniform size. In FIG. 3 a uniform cell is shown at 20 having cell walls 21 with six faces $21^a$, $21^b$, $21^c$, $21^d$, $21^e$ and $21^f$ disposed substantially equal in size and angular relationship one to the other in the fully expanded condition.

It has been found, however, that in the practice of expanding metal honeycomb by pulling the block apart, i.e., the method hereinabove set forth, that particularly in honeycomb employing metal foil of the thinner dimensions or gages that there is substantial irregularity in the cell configuration formed.

It is believed, but not definitely known, that the yield strength has an important influence on the uniformity of resultant cell structure. The tensile strength may also have an influencing factor on the uniformity of expansion.

In the improvement of this invention the expansion of honeycomb block 9 is accomplished by first refrigerating or cooling block 9 substantially below room temperature. Cooling can be accomplished by various means such as by using a refrigerator chamber to enclose block 9 as schematically illustrated by dotted lines 25 in FIGS. 1 and 2, covering the block with Dry Ice or spraying the block with a gas such as $CO_2$ or immersing the block in liquid air. The expansion of block 9 should take place during the period in which the webs forming the block are at the lowest temperature. The resulting cell configuration is substantially more uniform and regular than when the block is expanded under normal room temperatures.

It is believed, but not definitely known, that the reason for the increased regularity of cell structure is due to the increase in yield strength of the web which occurs at lower temperature ranges.

The examples illustrate methods of practicing the present invention it being understood, however, that the conditions set forth in the examples may be varied as to temperature and metallurgical characteristics of the foil.

*Example I*

An unexpanded honeycomb block of one-quarter inch nominal all size, one-quarter inch thickness and node bonded by a vinyl phenolic thermoplastic thermosetting resin, i.e., "Hexcelite" 819 produced by Hexcel Products Inc., was manufactured from foil formed of 3003–H19, manufacturers' designation, the Aluminum Company of America, and also designated as 3S–H19. This alloy contains approximately .6% silicon, .7% iron, .20% copper, 1.0 to 1.5% manganese, .10% zinc, .05% other and the remainder composed of aluminum. The unexpanded honeycomb was then surrounded with Dry Ice to bring the temperature of the alloy down to approximately −109° F. With this metal the decrease of temperature will cause increase yield strength of approximately 7% over the yield strength at room temperature. The honeycomb cell configuration produced exhibited greater cell regularity and configuration as compared with samples of the same material expanded at room temperature.

*Example II*

A block of honeycomb material formed of sheet material identical to the material used for Example I was treated with liquid nitrogen to cool the unexpanded honeycomb to approximately −320° F. In this temperature the yield strength of the metal is increased in excess of 20% over the yield strength at room temperature. The block of unexpanded honeycomb was then expanded while in the lower temperature condition and the resultant cell configuration was observed to exhibit substantially improved uniformity over the samples obtained through Example I and a sample standard which has expanded at room temperature.

Although the foregoing invention has been described in some detail by way of illustration and example for purposes of clarity of understanding, it is understood that certain changes and modifications may be practiced within the spirit of the invention as limited only by the scope of the appended claim.

What is claimed is:

In a method of expanding an unexpanded honeycomb block the steps of: lowering the temperature of the block of unexpanded aluminum alloy foil honeycomb to within the range of about −100 to −320° F. and pulling opposite ends of the block apart to expand the block to form honeycomb cells while said block is maintained within said reduced temperature range, whereby to obtain greater uniformity of cell expansion than if said block were expanded at room temperature.

References Cited in the file of this patent

UNITED STATES PATENTS

| | | |
|---|---|---|
| 2,527,287 | Ziegler et al. | Oct. 24, 1950 |
| 2,756,496 | Holland | July 31, 1956 |
| 2,790,207 | Steele et al. | Apr. 30, 1957 |

OTHER REFERENCES

Metals Handbook, 1948 Edition, American Society for Metals, Cleveland, Ohio, relied on pages 204–216.

Steel Processing, vol. 37, Issue I, January 1951, page 24.

Metal Progress, May 1949, pages 643–648, "Mechanical Properties of Stainless Steels at Sub-Zero Temperatures," Hoke, Mabus, and Goller.

Transactions American Society for Metals, vol. 52, Reprint No. 132, Hill, Barker, and Willey.